United States Patent [19]
Butte, Jr. et al.

[11] 4,181,680
[45] Jan. 1, 1980

[54] HYDROGENATION OF AROMATIC AMINES

[75] Inventors: Walter A. Butte, Jr., West Chester; Howard P. Angstadt, Media, both of Pa.

[73] Assignee: Suntech, Inc., Philadelphia, Pa.

[21] Appl. No.: 8,309

[22] Filed: Feb. 1, 1979

[51] Int. Cl.$^2$ .................. B01D 15/06; B01J 37/00
[52] U.S. Cl. .................. 260/563 D; 252/420; 252/413
[58] Field of Search .................. 260/563 D

[56] References Cited

U.S. PATENT DOCUMENTS

| | | | |
|---|---|---|---|
| 2,606,926 | 8/1952 | Kirby | 260/563 D |
| 2,955,926 | 10/1960 | Illich et al. | 260/563 D X |
| 3,632,648 | 1/1972 | Corr et al. | 260/563 D |
| 3,729,512 | 4/1973 | L'Eplattenier et al. | 260/563 D X |
| 3,743,677 | 7/1973 | Grosskinsky et al. | 260/563 D |

FOREIGN PATENT DOCUMENTS

| | | | |
|---|---|---|---|
| 1305090 | 8/1962 | France | 260/563 D X |
| 1149251 | 4/1969 | United Kingdom | 260/563 D X |

*Primary Examiner*—Paul F. Shaver
*Attorney, Agent, or Firm*—J. Edward Hess; Donald R. Johnson; Paul Lipsitz

[57] ABSTRACT

A process for the hydrogenation of aromatic bis-methylamines, such as m- and p-xylylenediamine, to the corresponding cycloaliphatic compound by hydrogenating the bis-methylamine in water as a solvent system, devoid of added ammonia and in the presence of a supported ruthenium catalyst.

8 Claims, No Drawings

HYDROGENATION OF AROMATIC AMINES

CROSS REFERENCES TO RELATED APPLICATIONS

This application is related to the following applications filed of even date herewith.

Walter A. Butte, Jr., William J. Murtaugh, and Howard P. Angstadt, entitled "Process For Hydrogenating Aromatic Dinitriles", Ser. No. 8313, filed Feb. 1, 1979.

Walter A. Butte, Jr., William J. Murtaugh and Richard E. Mitchell, entitled "Hydrogenation of Aliphatic Nitriles To Primary Amines", Ser. No. 8310, filed Feb. 1, 1979.

Walter A. Butte, Jr. and William J. Murtaugh entitled "Hydrogenation of Aromatic Nitriles To Primary Amines", Ser. No. 8315, filed Feb. 1, 1979.

It is known in the art to hydrogenate the aromatic ring system of amino-alkyl aromatics to the corresponding cycloaliphatic system. Thus, for example, French Pat. No. 1,305,090 discloses that m-xylylene-diamine may be hydrogenated to saturate the ring in a non-aqueous system using a supported ruthenium and/or rhodium catalyst. This reference also discloses the desirability of adding ammonia to the system if the maximum amount of primary amine is desired, it being known that the presence of ammonia suppresses the formation of secondary and tertiary amines which could be formed during the hydrogenation.

Also of interest is United Kingdom Pat. Specification No. 1,149,251 which discloses that aromatic diamines may be converted to the corresponding cycloaliphatic diamines by hydrogenation with a ruthenium catalyst in a nonaqueous solvent system (saturated aliphatic hydrocarbons or ethers) in the presence or absence of ammonia.

In such hydrogenation processes the rates of reaction are frequently low and yields of product are not as high as desired. Also, because numerous by-products are formed during the reaction the catalyst becomes poisoned and cannot be repeatedly reused without a regeneration step. It has now been found that these problems can be eliminated or mitigated to a large extent by the process of this invention. In accord with the process of this invention an aromatic bis-methyl amine is ring hydrogenated to the corresponding cycloaliphatic compound by carrying out the hydrogenation in water as a solvent system and in the presence of a supported ruthenium catalyst. It is entirely unexpected, as will be explained later, that the process gives high rates of reaction, high yields of product and maintains continued viability of the catalyst.

The process of the invention may be carried out with a wide variety of aromatic bis-methylamines, but the bis-methylamines of the benzene and naphthalene series will be most useful in the process. Preferably, those aromatic bis-methylamines of the benzene series will be used and these will be most preferably m-and p-xylylenediamine.

Reaction conditions will be at a temperature of from about 50° to about 150° C. and at a pressure of between about 500 and about 2000 psig. These conditions are relatively mild and thereby provide another important advantage for the process since lower operating costs result from use of mild conditions. It is also particularly surprising that hydrogenation of the aromatic ring can be made to occur under these relatively mild conditions. Preferred temperature for the process will be about 75° to about 130° C., and preferred pressure is from about 1000 to about 1500 psig.

The catalyst, as indicated, will be supported ruthenium. Preferably, the supports useful will include carbon, alumina and activated alumina, silica, including synthetic gel and kieselguhr, calcium carbonate, titanium dioxide, bentonite, barium sulfate, etc. Preferably, the ruthenium catalyst (employed in the form of its black) will be from about 0.1 to 10 percent by weight of the total catalyst and support. These catalysts and their method of preparation are known in the art (see for example U.S. Pat. No. 3,117,162).

It is known in the art that catalysts often become inactive after prolonged use and this phenomenon also occurs with the catalyst used in the process of the invention. However, it has been found that the catalytic activity is readily restored by simply washing it with an aqueous mineral acid, preferably HCl, and then rinsing the treated catalyst with water to remove all traces of acid.

In carrying out the process of the invention the aromatic bis-methylamine, water and catalyst are charged to the appropriate pressure reactor and after closing the reactor it is heated up to a temperature of from about 50° C. to about 150° C. At this point hydrogen is pressured in to the desired pressure and as stirring or other agitation is maintained the uptake of hydrogen is observed. After hydrogen absorption stops, stirring is continued for a short time, the reactor cooled, opened and the contents filtered. The filtrate is distilled to separate the water solvent from the product. Isolation and purification of the product is readily accomplished by vacuum distillation.

It will be understood, of course, that in addition to carrying out the process by the batch technique described above, a continuous operation may also be used. In such a case, a packed bed of catalyst may be used through which the reaction solution and hydrogen are simultaneously passed.

The amount of water used in the reaction may vary over a wide range: about 1 part by weight of amine to about 1 to 10 parts of water will be used.

It is also to be understood that the starting aromatic bis-methylamine should be of relatively high purity for optimum reaction rate and long catalyst life. Frequently, the aromatic bis-methylamine starting material is made by hydrogenation, with a cobalt or nickel catalyst of an aromatic bis-nitrile such as terephthalonitrile. Distillation of the aromatic bis-amine product from the reaction mass of its preparation provides a suitable starting material for the process of the invention and contributes significantly to the high reaction rates and long catalyst life.

As indicated above, significant parameters of the invention are the use of water as a solvent medium and the absence of ammonia from the system.

While it is not known with certainty why a water solvent gives the improved process it is speculated that the relatively high solubility of the aromatic diamine (e.g. solubility of p-xylylene diamine in water is $>150$ g/100 g. $H_2O$), which is also unusual for an organic material, enables the polarity of the water to be influential in keeping catalyst surface washed free of impurities and/or generated catalyst poisons, thus resulting in longer catalyst life.

Also it would be expected, in view of the prior art teaching to add ammonia during nitrile reductions to retard formation of secondary and tertiary amines, that it would be desirable to use ammonia in the reaction system. However, it is found that with the water system of the invention, ammonia is detrimental and should not be used. The solvent system is preferably essentially entirely aqueous, but other conventional ether-type solvents such as tetrahydrofuran, the dimethylether of ethylene glycol (e.g. DIGLYME), and the like may be used, generally in amounts less than about 50% by weight of the water used.

In order to further illustrate the invention the following examples are given:

EXAMPLE 1

Five hundred grams of crude solid para-xylylene diamine (PXDA) was dissolved in 500 g. of distilled water and 2 g. of a 5% ruthenium catalyst supported on alumina added. The solution was then charged to a two liter autoclave and heated to 130° C. and then pressured to 1600 psi total pressure with hydrogen. As the reaction proceeded hydrogen was continually added so that the total pressure was maintained between 1500 and 1600 psi, recording the length of time required for each 100 psi drop in pressure. After over 900 minutes the rate of uptake was about ⅓ its original value and steadily decreasing. During this reaction the average time required to consume 100 psi of hydrogen was 23.6 min. Chromatographic analysis indicated that the diamine was 73% converted and the yield of 1,4-bis(aminomethyl)cyclohexane (BAMCH) was 62% based on feed.

When this experiment was repeated using pure white solid diamine which had been distilled prior to use, 100% conversion of the diamine was obtained, the average time for consumption of 100 psi of hydrogen was 15.5 minutes and chromatographic analysis of the product indicated a yield of 1,4bis(aminomethyl)-cyclohexane of 88% based on charge.

This data demonstrates the importance on rate of reaction and yield of desired product of using a pure starting material. Thus, when the aromatic bis-methylamine is obtained by hydrogenation of the aromatic dinitrile it is important for optimum yield to purify the aromatic bis-amine before hydrogenation in accord with the process of this invention.

EXAMPLE 2

It has been generally accepted that carrying out hydrogenation to product amines is best done in an ammonia environment, but the following data shows that in the reduction of xylylene diamines to bis(aminomethyl)-cyclohexanes, water devoid of ammonia is a superior solvent to aqueous ammonia.

Table 1 summarizes the results obtained from hydrogenating successive batches of 40 g. of para-xylylene (PXDA) in 360 mls. of either aqueous ammonia or water using 2.0 g. 5% Ru/Al$_2$O$_3$ at 100° C. and hydrogen to make 1500 psig total pressure. The table lists the time required to take up cumulatively 600 psi of hydrogen. It can be readily seen that after 3 batches using NH$_3$/H$_2$O the temperature had to be raised to restore the rate of reaction (never returned to original rate) and during the 6th batch the catalyst became ineffective. Using water however, six batches were reduced before the temperature had to be raised.

On raising the temperature the original rate of reaction was obtained and the catalyst remained active after ten such reductions. This data illustrates the beneficial effect of using water for this reduction.

TABLE I

HYDROGENATION OF PXDA IN AMMONIA-WATER AND WATER
(360 mls solvent; 40 g. PXDA 2 g. 5% Ru/Al$_2$O$_3$, 100° C., 1500 psig total

| Batch No. Cummulative H$_2$ Uptake (psi) | NH$_3$/H$_2$O | | | | | | H$_2$O | | | | | | | | | |
|---|---|---|---|---|---|---|---|---|---|---|---|---|---|---|---|---|
| | 1 | 2 | 3 | 4# | 5# | 6# | 1 | 2 | 3 | 4 | 5 | 6 | 7# | 8# | 9# | 10# |
| | Time (minutes) | | | | | | | | | | | | | | | |
| 100 | 10 | 10 | 46 | 23 | 32 | 70 | 12 | 16 | 25 | 29 | 12 | 33 | 11 | 5 | 6 | 10 |
| 200 | 18 | 32 | 75 | 40 | 62 | 160 | 22 | 34 | 50 | 54 | 36 | 72 | 23 | 21 | 21 | 30 |
| 300 | 25 | 50 | 101 | 59 | 83 | 195 | 32 | 54 | 77 | 79 | 62 | 107 | 34 | 35 | 36 | 40 |
| 400 | 35 | 70 | 135 | 74 | 115 | — | 45 | 75 | 102 | 107 | 90 | 136 | 45 | 46 | 50 | 54 |
| 500 | 47 | 89 | 159 | 92 | 151 | — | 66 | 98 | 132 | 136 | 118 | 179 | 58 | 57 | 61 | 65 |
| 600 | 75 | 108 | 196 | 112 | 203 | — | 96 | 125 | 173 | 168 | 151 | 220 | 72 | 72 | 79 | 79 |

Temperature raised to 125° C.

EXAMPLE 3

This example illustrates the reactivation of the catalyst after it loses some or all of its activity due to prolonged use.

A two-liter stainless steel autoclave was charged with 500 g. of PXDA, 500 g. water and 2. g. of 5% Ru/Al$_2$O$_3$, brought to 125° C. and charged to 1500 psig with hydrogen. Agitation was begun and the rate of hydrogen uptake was measured keeping the total pressure between 1400 and 1500 psig. The initial rate of conversion of the aromatic diamine to BAMCH at this temperature was 25.4 g./g-cat./hr. When the reaction was completed, the contents of the reactor were filtered and the catalyst reused with a second batch of amine under the same conditions of reaction. In this case the rate of conversion of the p-xylene diamine fell to 12.6 g./g-cat./hr. Again the reactor was drained; this time the catalyst was slurried in a solution of 80 cc conc. HCl and 320 CC H$_2$O, filtered and extensively washed with water to remove all traces of acid. When this catalyst was reused with a fresh batch of diamine under identical reaction conditions the observed rate of PXDA conversion had returned to 26.4 g/g.-cat./hr.

EXAMPLE 4

Table II illustrates the results obtained in the hydrogenation of p-xylylenediamine (PXDA) with a catalyst of 5% ruthenium on alumina under various conditions. It will be seen that conversion is increased and high selectivity for desired product (BAMCH) is maintained by washing the catalyst with aqueous HCl and by using a purified PXDA starting reactant.

TABLE II

PXDA REDUCTION WITH 5% Ru/Al$_2$O$_3$
500 g. PXDA/500g. H$_2$O -2 g. CATALYST

| Run | PXDA Reacted (g.) | % Conversion | BAMCH Formed (g.) | % Selectivity | Temp. °C. | Pressure (psig) |
|---|---|---|---|---|---|---|
| A | 325 | 65 | 304 | 93 | 100/125 | 1500/1400 |
| B | 153 | 31 | 142 | 93 | 125 | " |
| Note 1 | | | | | | |
| C | 498 | 99 | 347 | 70 | 125 | " |
| D | 458 | 92 | 404 | 88 | 125 | " |
| E | 364 | 73 | 311 | 85 | 130 | 1600/1500 |
| Note 2 | | | | | | |
| F | 500 | 100 | 440 | 88 | 130 | " |
| G | 486 | 97 | 453 | 93 | 130 | " |
| H | 486 | 97 | 381 | | | |

Note 1 Washed catalyst with 4N HCl after run B and after each subsequent experiment.
Note 2 Used purified (distilled) PXDA for all subsequent experiments.

The invention claimed is:

1. A process for the hydrogenation of aromatic bis-methylamines to the corresponding cycloaliphatic compound by hydrogenating the bis-methylamine at a temperature of from about 50° C. to about 150° C., at a pressure of between about 500 and about 2000 psig, in water as a solvent system devoid of added ammonia and in the presence of a supported ruthenium catalyst.

2. The process of claim 1 wherein the aromatic bis-methylamine is of the benzene and naphthalene series.

3. The process of claim 2 wherein the bis-methylamine is p-xylylenediamine.

4. The process of claim 2 wherein the bis-methylamine is m-xylylenediamine.

5. A process for the hydrogenation of aromatic bis-methylamines to the corresponding cycloaliphatic compound by hydrogenating the bis-methylamine at a temperature of from about 75° to about 130° C., at about 1000 to about 1500 psig, in water as a solvent system, devoid of added ammonia, and in the presence of a supported ruthenium catalyst.

6. The process of claim 5 wherein the aromatic bis-amine is p-xylylenediamine.

7. The process of claim 6 wherein the p-xylylenediamine is purified before the hydrogenation.

8. A process for regenerating a supported ruthenium catalyst used in the hydrogenation of an aromatic bis-methylamine to the corresonding cycloaliphatic compound by washing said catalyst with an aqueous mineral acid.

* * * * *